United States Patent [19]

Zahn et al.

[11] Patent Number: 4,790,976
[45] Date of Patent: Dec. 13, 1988

[54] DEVICE FOR INSTALLING DRY PDD LANCES AND FOR FLUSHING OUT LANCE-HOUSING TUBES IN BOILING WATER REACTORS

[75] Inventors: Artur Zahn, Bessenbach; Karl Hannappel, Wiesthal, both of Fed. Rep. of Germany

[73] Assignee: Kraftwerk Union Aktiengesellschaft, Mülheim, Fed. Rep. of Germany

[21] Appl. No.: 894,693

[22] Filed: Aug. 8, 1986

[30] Foreign Application Priority Data

Aug. 9, 1985 [DE] Fed. Rep. of Germany ....... 3528723

[51] Int. Cl.⁴ ............................................. G21C 19/20
[52] U.S. Cl. .................................. 376/260; 376/245; 376/316
[58] Field of Search ............... 376/260, 310, 316, 245, 376/249, 203, 254

[56] References Cited

U.S. PATENT DOCUMENTS

| | | | |
|---|---|---|---|
| 3,186,915 | 6/1965 | Danieli et al. | 376/260 |
| 4,158,600 | 6/1979 | Akimoto et al. | 376/260 |
| 4,518,559 | 5/1985 | Fischer et al. | 376/260 |

FOREIGN PATENT DOCUMENTS

| | | |
|---|---|---|
| 2817830 | 10/1979 | Fed. Rep. of Germany . |
| 2832122 | 1/1980 | Fed. Rep. of Germany . |
| 0192994 | 11/1984 | Japan ................................ 376/260 |

OTHER PUBLICATIONS

Nuclear Engineering International, vol. 29, No. 356, Jun. 1984, p. 35 and 36; "Cleaning the Thimble Guide Tubes at Bugey".

Primary Examiner—Deborah L. Kyle
Assistant Examiner—Daniel Wasil
Attorney, Agent, or Firm—Herbert L. Lerner; Laurence A. Greenberg

[57] ABSTRACT

Device for flushing out a lance-housing tube in a reactor pressure vessel of a boiling-water reactor and for aligning therein a dry LVD lance which partly protrudes with a pressure-tight lance passthrough from an end flange on the lance-housing tube of the reactor pressure vessel, includes a tubular housing surrounding from below a part of the lance protruding from the reactor pressure vessel and sealed by a lance protection tube, the tubular housing being fastenable to the end flange; and a piston arranged in the tubular housing underneath the sealed lance, the piston being vertically displaceable and rotatable.

5 Claims, 4 Drawing Sheets

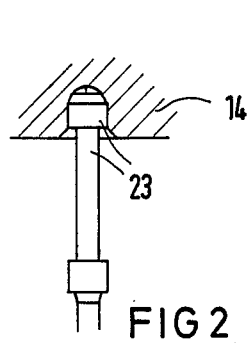
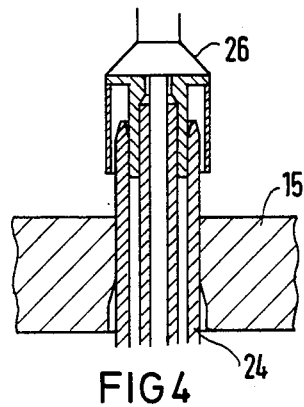
FIG 2
FIG 4
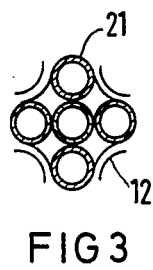
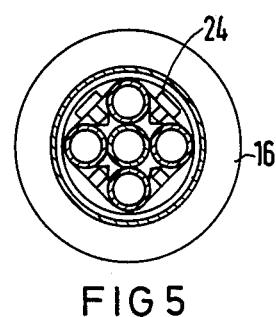
FIG 3
FIG 5
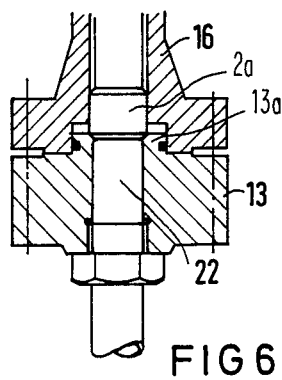
FIG 6

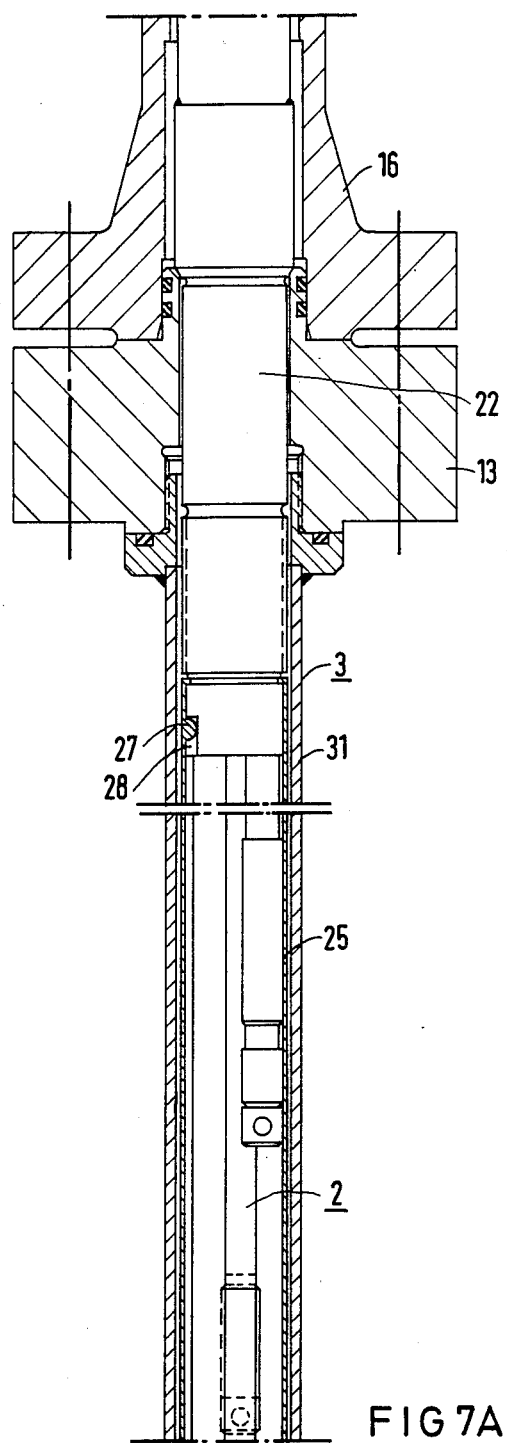

DEVICE FOR INSTALLING DRY PDD LANCES AND FOR FLUSHING OUT LANCE-HOUSING TUBES IN BOILING WATER REACTORS

The invention relates to a device for flushing out a lance-housing tube and for aligning in a reactor pressure vessel of a boiling-water reactor a dry power distribution detector (PDD) lance, which partly protrudes with a pressure-tight lance feedthrough or passthrough from an end flange on the lance-housing tube of the reactor pressure vessel.

Neutron flux density in a reactor core is an important characteristic for monitoring and controlling nuclear power generating stations. It is measured with detectors, respective groups of four detectors with a surrounding supporting tube forming a so-called PDD lance. During assembly, these lances are vertically inserted by a gripper of a lifting device into a partially unloaded core while the reactor pressure vessel is opened and flooded, and are held in a mounting at an upper end of the lance by upwardly spring-loaded locking pins. Accordingly, the lower end of the lance with a pressure-tight feedthrough or passthrough and a lance protection tube partly protrudes from an end flange on the lance-housing tube of the reactor pressure vessel. A housing assembled therewith prevents the reactor water from running out during the installation.

Instrumentation lances of different construction have become known heretofore. The lance installed most frequently to date is a so-called web wet PDD lance. It remains operative for only a few years and must then be disassembled completely and scrapped. Attempts have therefore been made to replace the wet PDD lances by a relatively new type of lance, the so-called dry PDD lance, which advantageously has an extremely long operating life. Dry PDD lances therefore need not be replaced.

In the course of the operation of a reactor, radioactive deposits are formed in the reactor pressure vessel which are disposed in part in the lance-housing tubes, and therefore also on the lance feedthrough or passthrough. If long-lived dry lances are installed which are not to be replaced, the deposits increase continuously so that a consequence is the formation of a locally extremely high radiation level in the periodically accessible region below the reactor pressure vessel. Cleaning the lance-housing tubes, however, has been found not to be economically feasible heretofore because the reactor must be shut down considerably longer than for a change of fuel assemblies and must be partially discharged. Because the lances increase in diameter from top to bottom, they can be pulled out of the core with an upward inclination only if the reactor pressure vessel is opened and flooded. The adjacent fuel assembly cases must moreover be removed first in order to avoid damage. Only then it is possible to lift a lance so that the end flange is flushed out or rinsed by reactor water which runs out under controlled conditions and must then be collected underneath the reactor pressure vessel.

The heretofore conventionally used wet lances have a circular cross section so that angular orientation is unnecessary during assembly. Installation under water thereby presents no problems. The new dry PDD lances which are preferred for reasons of cost and environment protection are, however, thicker because of their liquid-tight construction and have a pronounced profile. Their cross section has, for example, the shape of a clover leaf, so that the space available in the core grid is better utilized. A dry PDD lance must therefore be aligned accurately relative to the reactor core in order to avoid damage. Because of the great length and the elasticity of the lances they cannot be inserted under water from above into the reactor pressure vessel. The danger would exist that the profiled lances would become twisted or tilted during the alignment and cause damage to the fuel assembly cases or casings when released.

Because the conical sealing seat of the lance is loaded by the lance weight of approximately 250 N (Newton) as well as by a pressure of approximately 50 m water column, a rotation of the lance in the sealing seat would damage the sealing surfaces, especially if residual dirt is occluded. This would require costly repairs. If, on the other hand, the lance were lifted for rotation in order to preserve the sealing surfaces, the installation personnel would be endangered by escaping contaminated reactor water.

A flushing operation by conventional means is therefore not feasible economically. It would delay and impede work on the upper side of the pressure vessel when that work may have tight deadlines.

It is therefore an object of the invention to provide such a device which, for the first time, ensures a flushing to the lance-housing tubes when the reactor pressure vessel is closed and pressureless and, in addition, aligns the dry PDD lances relative to the reactor core.

With the foregoing and other objects in view, there is provided, in accordance with the invention, a device for flushing out a lance-housing tube in a reactor pressure vessel of a boiling-water reactor and for aligning therein a dry PDD lance which partly protrudes with a pressure-tight lance passthrough from an end flange on the lance-housing tube of the reactor pressure vessel, includes a tubular housing surrounding from below a part of the lance protruding from the reactor pressure vessel and sealed by a lance protection tube, the tubular housing being fastenable to the end flange; and a piston arranged in the tubular housing underneath the sealed lance, the piston being vertically displaceable and rotatable.

By this device, the lance feedthrough or passthrough and the lance protection tube assembled therewith at the end flange are first enclosed in a pressure-tight manner. Then, the piston is moved and lifted, respectively, by hand in the housing until it tangibly engages the lower end of the lance protection tube. Thereafter, if a dry PDD lance is used, the piston is rotated until it snaps in at the lower end of the lance protection tube. There, the piston, together with the lance, is pushed vertically upwardly. The lance is thereby lifted a short distance from its seat in the end flange so that reactor water runs out and the lance housing tube as well as the sealing seat of the lance is flushed out or rinsed. After the flushing operation is completed, the lance with the device according to the invention is deposited again in the sealing seat. If necessary, the dry lance is aligned beforehand exactly to the reactor core by rotating the piston.

With the device according to the invention, the advantage is attained that lances inserted into a reactor pressure vessel are freed of impurities and are subsequently arranged reliably again in a pressure-tight manner in the end flange after shutdown, even when the reactor pressure vessel is closed. Working above the reactor is not impeded. The importance of the device according to the invention increases by the fact that dry PDD lances are used increasingly. Whereas with each change of a short-lived lance, a flushing or rinsing operation is performed simultaneously, the long-lived dry PDD lances must be flushed out at given intervals, which can advantageously be performed with the device according to the invention.

In accordance with another feature of the invention, the piston is formed with an entrainer pin cooperatively engaging in a slot formed in the lance protection tube.

In accordance with a further feature of the invention, the lance protection tube is formed at an upper end in the interior thereof with a spherical member engageable in a marker slot formed in the lance passthrough. Movements of the piston are thereby transmitted exactly to the lance via the lance protection tube which originally served only for sealing during the assembly.

For lifting and lowering the unit formed of the piston, the protective tube and the lance, the device, according to an added feature of the invention is equipped with a cap screw which supports the piston and is cooperatively secured with a thread formed on an outer surface of the tubular housing. This cap screw is provided with handles. An advantage is thereby achieved that the lance will always be lifted sensitively without tools and with little effort even though it is loaded with a water column of about 50 m and its own weight of about 250 N (Newton).

In accordance with an added feature of the invention, the piston is formed with a flow passage for reactor water, and including a valve disposed in said passage. The flow of discharging reactor water flushing out the lance is thereby controlled. If only clean water flows off, the lance is again deposited in the sealing seat.

In order that the dry PDD lance should remain or be aligned exactly, and in accordance with a concomitant feature of the invention, a telescoping folding lever, for example, is arranged on the piston of the device. With this relatively long pointer lever, the dry lance is slightly turned, if necessary, before being deposited or seated, thereby assuring an exact alignment or orientation with the geometry of the reactor core and the fuel assembly casings, respectively. The aligned lance is then deposited in the end flange by downwardly screwing the cap screw which supports the piston of the device. Thereafter, the device is drained and detached from the end flange after a test for tightness i.e. for leaks.

With the invention, an advantage is achieved, in particular, that dry PDD lances, which remain operative in the reactor for the entire operating period, can be retrofitted even in previously contaminated installations. Not economical shutdown times are thereby shortened and the production of highly radioactive scrap is drastically reduced.

Other features which are considered as characteristic for the invention are set forth in the appended claims.

Although the invention is illustrated and described herein as embodied in device for installing dry PDD lances and for flushing out lance-housing tubes in boiling-water reactors, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawing, in which:

FIG. 2 is an enlarged fragmentary view of FIG. 1 showing part of the PDD lance with a latching pin;

FIG. 3 is a cross-sectional view of a dry PDD lance in the core grid;

FIG. 4 is a fragmentary longitudinal sectional view of the PDD lance in a feedthrough or passthrough of the lower grid plate FIG. 5 is a cross-sectional view of a dry PDD lance in a lance housing tube;

FIG. 6 is a fragmentary enlarged longitudinal sectional view of a terminating flange and feedthrough; and FIGS. 7A and 7B are a longitudinal sectional view of respective upper and lower portions of the device according to the invention for mounting a dry PDD lance and for flushing the housing tube.

Figure 1:
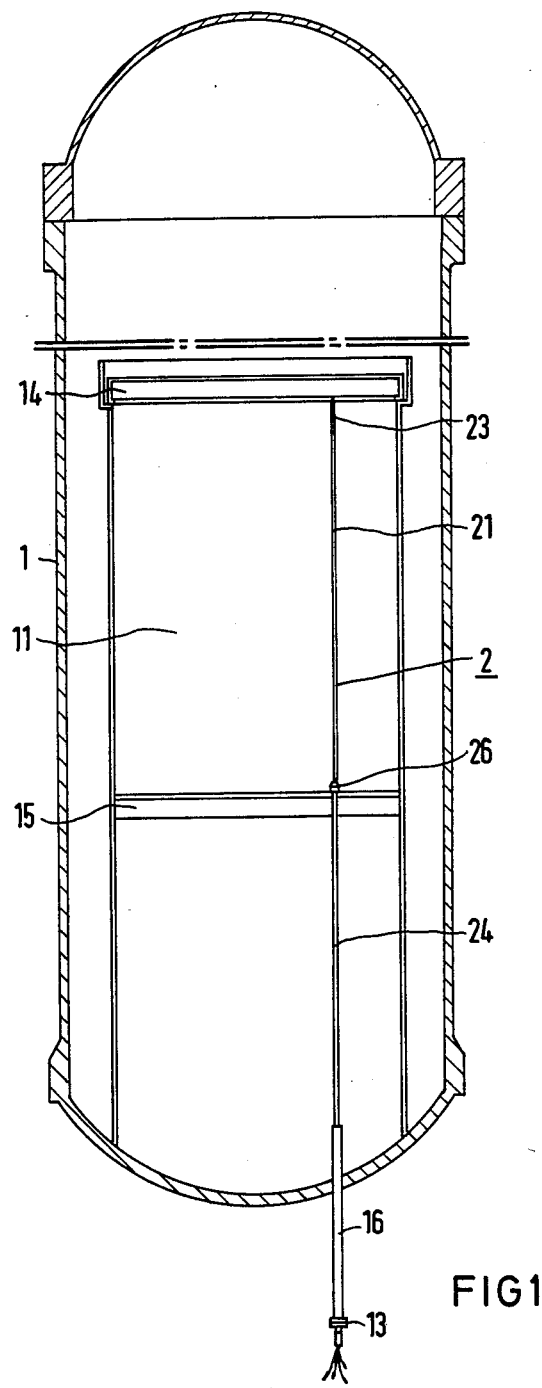
FIG. 1 is a diagrammatic vertical sectional view of a reactor pressure vessel of a boiling-water reactor with a built-in PDD lance.

Referring now to the drawing and first, particularly, to FIG. 1 thereof, there are provided, in a reactor pressure vessel 1 of a boiling water reactor, dry PDD lances 2 only one of which is shown which contain detectors for measuring neutron flux density, the PDD lances 2 being arranged in a reactor core 11. These detectors are connected via cables to a computer which processes the measured values of 100 to 200 detectors. In one dry PDD lance 2, four detectors are arranged above one another. They are first surrounded by pressure-tight dry thimble tubes and fastened to a so-called calibrating tube. An enclosing upper support tube 21 has a cross section in the shape of a clover leaf, as is shown in FIG. 3. The dry lance 2 with its relatively large cross-sectional area can thereby be inserted into the narrow water gap of the core grid 12. In the interest of simplification, as aforementioned, only one dry PDD lance 2 is shown in the reactor pressure vessel 1 of FIG. 1.

The lance 2 is inserted into the opened reactor pressure vessel 1 from above. The upper end of the lance 2 is held in the upper core grid plate 14 by an upwardly spring-loaded latching pin 23 according to FIG. 2. Below the lower core grid plate 15, the lance 2 is surrounded, according to FIGS. 4 and 5, by a lower support tube 24 of circular cross section which is joined by a sleeve 26 to the upper tube 21. In the bottom of the reator pressure vessel 1, a lance-housing tube 16 is arranged in a pressure-proof manner, according to FIG. 1, for receiving therein the lance 2, as shown in FIG. 5. Thereat, a lance feedthrough or passageway 22, together with the lance 2, in accordance with FIG. 6 extends through an end flange 13 from the lance housing tube 16 in a pressure proof manner and threadedly secured or bolted. Deposits are formed during the operating period in the reactor vessel 1 and also penetrate into the lance-housing tube 16 as well as into the region of the end flange 13 and the lance feedthrough 22.

Figure 7B:
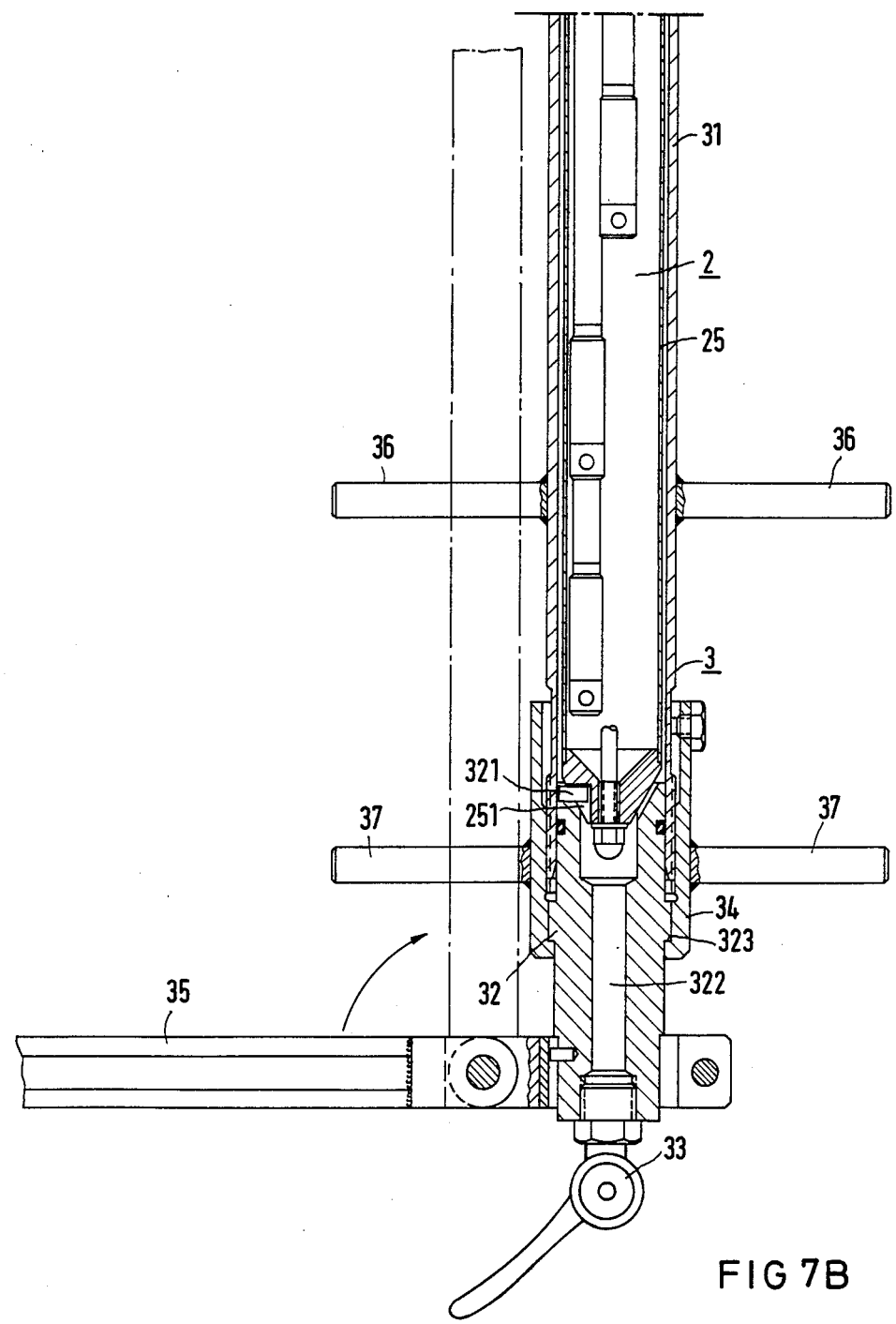

To reduce the radiation in the accessible area underneath the reactor pressure vessel 1, the lance 2 is lifted by the device 3 according to the invention as shown in FIGS. 7A and 7B, is flushed out or rinsed and, because of the cloverleaf profile of the upper protection tube 21, is subsequently realigned and seated with the lance feedthrough 22, seated by an enlargement 2a thereof; in the sealing seat 13a of the end flange 13.

The inventive device 3 for mounting dry lances 2 and for flushing out the lance housing tubes 16 has a tubular housing 31 which surround with radial clearance the part of the lance 2 protruding from the end flange 13 at the reactor pressure vessel 1 and which is protected thereat by a lance protection tube 25. The device 3 is guided over the lance protection tube 25 from below and is fastened to the end flange 13 in a pressure-proof manner.

In the housing 31 of the device 3, a piston 32 is arranged movably and rotatably underneath the lance 2. To the piston 32, there is fastened an entrainer pin 321 which snaps into a slot 251 formed in the lance protection tube 25 when the piston 32 is lifted and turned by hand. Accurately aligned therewith, a spherical piece 27 which engages a marking slot 28 in the lance feedthrough 22 is formed in the upper end of the lance protection tube 25. The motions of the piston 32 are thereby transmitted exactly to the lance 2. In the piston 32 there is formed, in the axis of the device 3, a passage 322 for reactor water which can be closed off by a ball valve 33. The piston 32 is supported on a shoulder 323 by a cap screw 34 which cooperates with a thread on the outside surface of the housing 31. By turning the cap screw 34, the piston 32 and the lance 2 connected thereto are lifted out of the sealing seat in the end flange 13. Reactor water thereby flows through the gap between the lance feedthrough 22 and the end flange 13 into the space between the lance protection tube 25 and the housing 31 of the device 3. In this manner, the lance-housing tube 16 and the sealing region of the end flange 13 are flushed out or rinsed and freed of deposits. The water is conducted through the passage 322 formed in the piston 32 and drained intermittently at the ball valve 33. Firingly adhering impurities are thereby also separated. The flow of water is controlled by the ball valve 33 until only clear water flows off.

Dry PDD lances must not be twisted during the flushing or rinsing because they would otherwise damage adjacent fuel channels of the core grid 12 when the core 11 is fully loaded. The lance 2 is therefore accurately aligned relative to the core grid 12 by the device 3 according to the invention. To this end, a folding lever 35, which is arrangeable parallel to the housing 31 for facilitating the transport of the device 3, is disposed on the piston 32 of the device 3. This pointer-like folding lever 35 which is elongatable telescopically is folded into a position perpendicular to the housing 31 of the device 3 for exactly aligning the dry lance 2. Via this long lever arm, the lance 2 is aligned accurately relative to the geometry of the reactor core 11, including outstanding calibration points on the underside of the reactor. The lance 2 is then deposited in its sealing seat by turning the cap screw 34 and lowering the piston 32. After draining the device 3 at the ball valve 33 and checking for tightness, the device 3 according to the invention and the lance protection tube 25 are disassembled, and the lance 2 is secured by a nut. The device 3 is immediately ready for reuse elsewhere.

For better handling of the device 3 and for assembly without an additional tool, handles 36 and 37 are formed on the housing 31 and on the cap screw 34, respectively.

With the aforedescribed device 3, an exact alignment of the dry PDD lance 2 as well as a flushing out of lance-housing tubes 16 which contain dry or wet PDD lances can be performed for the first time with the reactor cover closed and the core 11 flooded.

The foregoing is a description corresponding, in substance, to German application No. P 35 28 723.3, dated Aug. 9, 1985, International priority of which is being claimed for the instant application, and which is hereby made part of this application. Any material discrepancies between the foregoing specification and the specification of the aforementioned corresponding German application are to be resolved in favor of the latter.

There is claimed:

1. In combination, a reactor pressure vessel of a boiling water reactor wherein reactor water is received, and a device for flushing out radioactive deposits accumulated in a lance-housing tube at least partly disposed in the reactor pressure vessel and for aligning in the lance-housing tube a dry power distribution detector lance which partly protrudes with a pressure-tight lance passthrough from an end flange on the lance-housing tube of the reactor pressure vessel and is supported in a seat on the end flange, comprising a tubular housing surrounding from below a part of the lance protruding from the reactor pressure vessel, said tubular housing being sealed by a lance protection tube and being fastened to the end flange; and a piston arranged in said tubular housing underneath the lance sealed in said tubular housing, and being vertically displaceable and rotatable so as to entrain and lift the lance out of said seat in which it is supported so that reactor water received in the reactor pressure vessel is admitted to the lance-housing tube, said piston being formed with a flow passage for the reactor water admitted to the lance-housing tube and including a valve disposed in said flow passage for controlling the flow of reactor water out of the reactor pressure vessel.

2. Device according to claim 1 wherein said piston is formed with an entrainer pin cooperatively engaging in a slot formed in said lance protection tube.

3. Device according to claim 1 wherein said lance protection tube is formed at an upper end in the interior thereof with a spherical member engageable in a marker slot formed in the lance passthrough.

4. Device according to claim 1 including a cap screw supporting said piston and cooperatively secured with a thread formed on an outside surface of said tubular housing.

5. Device according to claim 1 including a folding lever disposed on said piston.

* * * * *